United States Patent
Lee et al.

(10) Patent No.: US 11,287,525 B2
(45) Date of Patent: Mar. 29, 2022

(54) APPARATUS AND METHOD FOR IDENTIFYING SHORT CUT-IN VEHICLE AND VEHICLE USING THE SAME

(71) Applicants: HYUNDAI MOTOR COMPANY, Seoul (KR); KIA MOTORS CORPORATION, Seoul (KR); APTIV KOREA LLC, Yongin-si (KR)

(72) Inventors: Hoon Lee, Gunpo-si (KR); Ji Eun Won, Hwaseong-si (KR); Dong Gu Lee, Seoul (KR); Sang Bok Won, Seoul (KR); Min Kyun Yoo, Seoul (KR); Jae Pil Hwang, Seoul (KR); Hyung Sun Jang, Anyang-si (KR); Uk Il Yang, Yongin-si (KR); Hyok Jin Chong, Suwon-si (KR); Kyoung Jun Lee, Seoul (KR); Woo Young Lee, Hwaseong-si (KR); Seul Ki Han, Seoul (KR); Bo Young Yun, Hwaseong-si (KR); Su Min Jo, Hwaseong-si (KR); Seung Joon Lee, Seoul (KR); Byung Gi Hong, Yongin-si (KR); Soo Bin Jeon, Suwon-si (KR); Min Ho Park, Yongin-si (KR); Gi Hyun Seo, Seoul (KR); Kyu Ho Park, Yongin-si (KR); Jun Kwon Jee, Suwon-si (KR)

(73) Assignees: HYUNDAI MOTOR COMPANY, Seoul (KR); KIA MOTORS CORPORATION, Seoul (KR); APTIV KOREA LLC, Yongin-si (KR)

( * ) Notice: Subject to any disclaimer, the term of this patent is extended or adjusted under 35 U.S.C. 154(b) by 298 days.

(21) Appl. No.: 16/672,843

(22) Filed: Nov. 4, 2019

(65) Prior Publication Data
US 2020/0183003 A1    Jun. 11, 2020

(30) Foreign Application Priority Data

Dec. 10, 2018 (KR) .................. 10-2018-0158444

(51) Int. Cl.
*G01S 13/931* (2020.01)
*B60W 30/09* (2012.01)
*G01S 7/41* (2006.01)

(52) U.S. Cl.
CPC .......... *G01S 13/931* (2013.01); *B60W 30/09* (2013.01); *G01S 7/415* (2013.01);
(Continued)

(58) Field of Classification Search
CPC .................. G01S 13/931; G01S 7/415; G01S 2013/93274; G01S 2013/93271; B60W 30/09; B60W 2554/00; B60W 2420/52
See application file for complete search history.

(56) References Cited

U.S. PATENT DOCUMENTS

2010/0253539 A1* 10/2010 Seder .................. G01S 13/87
340/903

* cited by examiner

*Primary Examiner* — Michael D Lang
(74) *Attorney, Agent, or Firm* — McDonnell Boehnen Hulbert & Berghoff LLP

(57) ABSTRACT

An apparatus and method for identifying a short cut-in vehicle, and a vehicle using the same are disclosed. The apparatus includes a signal conversion unit configured to receive and signal-process a plurality of sensing signals, a computation unit configured to compute state information of a surrounding vehicle detected from the signal-processed signal, a sensor fusion track output unit configured to output a sensor fusion track based on the computed state information of the surrounding vehicle, an occupancy distance map (ODM) output unit configured to output ODM information including a grid map corresponding to a vehicle detection region and an ODM object including a plurality of detection
(Continued)

points based on the computed state information of the surrounding vehicle, and a cut-in vehicle identification unit configured to identify a cut-in vehicle based on the output sensor fusion track and ODM information.

20 Claims, 10 Drawing Sheets

(52) U.S. Cl.
CPC ..... *B60W 2420/52* (2013.01); *B60W 2554/00* (2020.02); *G01S 2013/93271* (2020.01); *G01S 2013/93274* (2020.01)

APPARATUS AND METHOD FOR IDENTIFYING SHORT CUT-IN VEHICLE AND VEHICLE USING THE SAME

CROSS REFERENCE TO RELATED APPLICATIONS

This application claims the benefit of Korean Patent Application No. 10-2018-0158444, filed on Dec. 10, 2018, which is hereby incorporated by reference as if fully set forth herein.

BACKGROUND

Field of the Disclosure

The present disclosure relates to a short cut-in vehicle identification apparatus, and more particularly, to an apparatus and method for identifying a short cut-in vehicle, and a vehicle using the same, for accurately identifying a situation of a short cut-in vehicle during low-velocity driving using sensor fusion track information and occupancy distance map (ODM) information in identification of the short cut-in vehicle.

Discussion of the Related Art

In general, vehicles have been developed as intelligent vehicles for providing enhanced safety and convenience using developed information communication technologies as well as enhancing fuel efficiency and performance as a transport device.

However, since an intelligent vehicle includes additional functions such as an entertainment system, an air filter, and a convenience device, a driver needs to manipulate other additional manipulation devices as well as a manipulation device for driving and, thus, there is increasing accident risk due to careless of a driver.

Accordingly, recently, research has been conducted in various ways into a safety device for preventing or avoiding vehicle crash.

Vehicle crash avoidance apparatuses include an adaptive cruise control system, a forward vehicle crash warning system, a lane departure warning system, and so on and these vehicle crash avoidance apparatuses are mainly used in the case of high-velocity traveling to prevent serious accidents and most of the technologies used by the vehicle crash avoidance apparatuses relate to detection of obstacles at a long distance in the case of high-velocity traveling.

However, with regard to most actual traffic accidents, 70% or greater of the accidents are mainly caused at low velocity equal to or less than about 30 km/h due to congested traffic characteristics in cities and, thus, a conventional crash avoidance apparatus is not appropriate to accurately recognize another vehicle that cuts in at a short distance during low-velocity driving and to prevent crash.

For example, when another vehicle cuts in at a short distance during low-velocity driving, a subject vehicle is not capable of accurately recognizing corner radar information due to noise included in the corner radar information or is not capable of accurately recognizing a situation of another vehicle that cuts in at a short distance during low-velocity driving due to coasting and, thus, misjudges the situation and crashes into another vehicle.

That is, a subject vehicle may have a difficulty in responding to track data output of a short cut-in vehicle during low-velocity driving in a congested condition on an expressway.

This is because it is difficult to extract a track signal due to excessive short-distance noise and it is difficult to identify short cut-in due to inaccurate track longitudinal/lateral position/heading information.

Accordingly, in the future, there is a need for an apparatus for identifying a short cut-in vehicle for preventing crash to enhance safety by accurately determining various situations of another vehicle that cuts in at a short distance during low-velocity driving.

SUMMARY

Accordingly, the present disclosure is directed to an apparatus and method for identifying a short cut-in vehicle and a vehicle using the same that substantially obviates one or more problems due to limitations and disadvantages of the related art.

An object of the present disclosure is to provide an apparatus and a method for identifying a short cut-in vehicle, and a vehicle using the method, for preventing crash to enhance safety by accurately identifying short cut-in vehicle during low-velocity driving based on sensor fusion track information and occupancy distance map (ODM) information including a grid map.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, an apparatus for identifying a short cut-in vehicle includes a signal conversion unit configured to receive and signal-process a plurality of sensing signals, a computation unit configured to compute state information of a surrounding vehicle detected from the signal-processed signal, a sensor fusion track output unit configured to output a sensor fusion track based on the computed state information of the surrounding vehicle, an occupancy distance map (ODM) output unit configured to output ODM information including a grid map corresponding to a vehicle detection region and an ODM object including a plurality of detection points based on the computed state information of the surrounding vehicle, and a cut-in vehicle identification unit configured to identify a cut-in vehicle based on the output sensor fusion track and ODM information.

In another aspect of the present disclosure, a method of identifying a short cut-in vehicle includes receiving a plurality of sensing signals, signal-processing the received sensing signals, computing state information of a surrounding vehicle detected from the signal-processed signal, outputting a sensor fusion track based on the computed state information of the surrounding vehicle, and ODM information including a grid map corresponding to a vehicle detection region and an ODM object including a plurality of detection points, based on the computed state information of the surrounding vehicle, and identifying a cut-in vehicle based on the output sensor fusion track and ODM information.

In another aspect of the present disclosure, a computer readable recording medium has recorded thereon a program for executing the method of identifying a short cut-in vehicle of a short cut-in vehicle identification apparatus.

In another aspect of the present disclosure, a vehicle includes a sensing apparatus configured to sense a surrounding vehicle, a short cut-in vehicle identification apparatus configured to determine a cut-in vehicle based on surrounding vehicle information received from the sensing apparatus, and a control apparatus configured to control driving of a subject vehicle based on identification information received from the short cut-in vehicle identification apparatus, wherein the short cut-in vehicle identification apparatus includes a signal conversion unit configured to receive and signal-process a plurality of sensing signals, a computation unit configured to compute state information of a surrounding vehicle detected from the signal-processed signal, a sensor fusion track output unit configured to output a sensor fusion track based on the computed state information of the surrounding vehicle, an occupancy distance map (ODM) output unit configured to output ODM information including a grid map corresponding to a vehicle detection region and an ODM object including a plurality of detection points based on the computed state information of the surrounding vehicle, and a cut-in vehicle identification unit configured to identify a cut-in vehicle based on the output sensor fusion track and ODM information.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
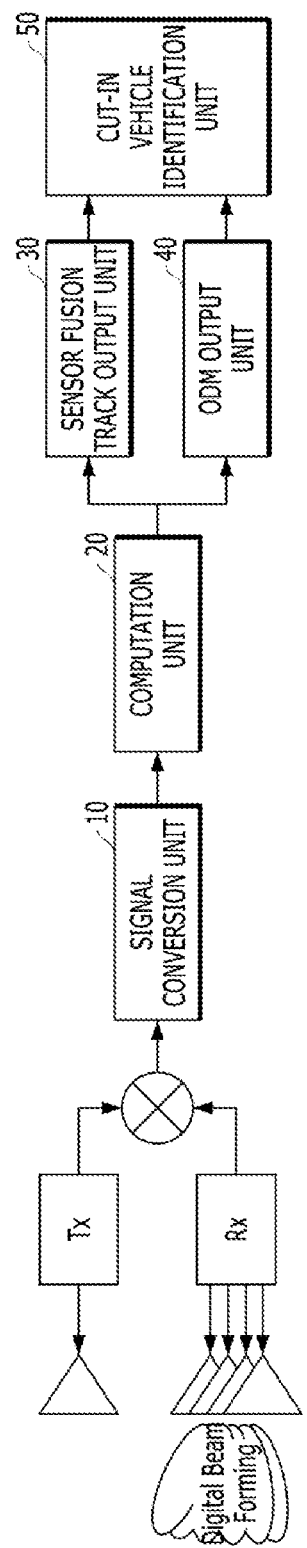
FIG. 1 is a block diagram for explanation of a short cut-in vehicle identification apparatus according to the present disclosure.

Exemplary embodiments of the present disclosure are described in detail so as for those of ordinary skill in the art to easily implement the disclosure with reference to the accompanying drawings. However, the present disclosure may be implemented in various different forms and is not limited to these embodiments. To clearly describe the present disclosure, parts unrelated to the description are omitted in the drawings and like reference numerals in the specification denote like elements.

Throughout the specification, one of ordinary skill would understand terms "include", "comprise", and "have" to be interpreted by default as inclusive or open rather than exclusive or closed unless expressly defined to the contrary. Further, terms such as "unit", "module", etc. disclosed in the specification mean units for processing at least one function or operation, which may be implemented by hardware, software, or a combination thereof.

Throughout the specification, when a certain part "includes" a certain component, this indicates that the part may further include another component instead of excluding another component unless there is no different disclosure. The same reference numbers will be used throughout the drawings to refer to the same parts.

Hereinafter, an apparatus and method for identifying a short cut-in vehicle and a vehicle using the same, applicable to embodiments of the present disclosure, are described in detail with reference to FIGS. 1 to 10.

FIG. 1 is a block diagram for explanation of a short cut-in vehicle identification apparatus according to the present disclosure.

As shown in FIG. 1, the short cut-in vehicle identification apparatus according to the present disclosure may include a signal conversion unit 10, a computation unit 20, a sensor fusion track output unit 30, an occupancy distance map (ODM) output unit 40, and a cut-in vehicle identification unit 50.

Here, the signal conversion unit 10 may receive and signal-process a plurality of sensing signals.

During reception of the plurality of sensing signals, the signal conversion unit 10 may receive the sensing signals from a front radio detection and ranging (RADAR) and a lateral RADAR of the subject vehicle.

The computation unit 20 may compute state information of a surrounding vehicle detected from the signal-processed signal.

Here, during computation of the state information of the detected surrounding vehicle, the computation unit 20 may compute distance information, speed information, and angle information of the detected surrounding vehicle.

For example, during computation of the distance information of the detected surrounding vehicle, the computation unit 20 may compute the distance information based on a delay time of a frequency modulated continuous wave (FMCW), but the present disclosure is not limited thereto.

As another example, during computation of the speed information of the detected surrounding vehicle, the computation unit 20 may compute the speed information based on the Doppler frequency, but the present disclosure is not limited thereto.

As another example, during computation of the angle information of the detected surrounding vehicle, the computation unit 20 may compute the angle information based on digital beamforming, but the present disclosure is not limited thereto.

Then, the sensor fusion track output unit 30 may output a sensor fusion track based on the computed state information of the surrounding vehicle.

Then, the ODM output unit 40 may output occupancy distance map (ODM) information including a grid map corresponding to a vehicle detection region and an ODM object including a plurality of detection points based on the computed state information of the surrounding vehicle.

During output of the ODM information, the ODM output unit 40 may output a grid map formed by dividing a front longitudinal and lateral region into six (6) parts, a longitudinal position, a lateral position, a longitudinal speed, a flag indicating presence or absence, and possibility information at a subject vehicle speed equal to or less than a predetermined speed.

For example, during output of the ODM information, the ODM output unit 40 may output the grid map at a subject vehicle speed equal to or less than about 20 kilometers per hour (kph) to about 30 kph.

The grid map may have a length of about 15 m to about 25 m in a front longitudinal direction of the subject vehicle, and may have a width of about 4 m to about 5 m in a front lateral direction of the subject vehicle.

During output of the ODM information, the ODM output unit 40 may generate a grid map corresponding to the vehicle detection region based on the lane information.

Here, the lane information may be extracted from information received from a navigation device or a front camera.

For example, the grid map may include two internal regions, two first external regions, and two second external regions.

A width of one internal region may be calculated according to IR=vehicle width/2+α (IR (Internal Region) being a width of an internal region, and α being a margin value in consideration of a side mirror).

Here, the vehicle width may be changed according to the specifications of the subject vehicle and α may be about 0.5 m to about 1.5 m, but the present disclosure is not limited thereto.

A width of one first external region may be calculated according to ER1=vehicle width/2−IR (ER1 (External Region1) being a width of the first external region, and IR being a width of an internal region).

Here, the vehicle width may be about 3 m to about 4 m, but the present disclosure is not limited thereto.

A width of one second external region may be about 0.2 m to about 0.8 m.

The length of the internal region may be the same as the length of each of the first and second external regions.

For example, the length of each of the internal region, and the first and second external regions may be about 15 m to about 25 m in a forward direction from a front surface of the subject vehicle.

As necessary, the length of the internal region may be smaller than the length of each of the first and second external regions.

For example, the length of the internal region may be about 15 m to about 25 m in the forward direction from the front surface of the subject vehicle.

The length of the first and second external regions may be the sum of a first length of about 15 m to about 25 m in the forward direction from the front surface of the subject vehicle and a second length of about 0.5 m to about 1.0 m in a backward direction from the front surface of the subject vehicle.

Also, specifications for each region in the grid map can be varied according to a vehicle type and a sensor specification.

Then, an area of the grid map may be changed depending on a speed of the subject vehicle.

For example, an area of the grid map may be widened as a speed of the subject vehicle is increased.

Then, during output of the ODM information, the ODM output unit 40 may generate a plurality of detection points based on effective detection information received from the front RADAR and the lateral RADAR of the subject vehicle, and may cluster a detection point group identified to be an object or a vehicle among the plurality of detection points positioned in the grid map to generate at least one ODM object.

Here, the effective detection information received from the front RADAR and the lateral RADAR of the subject vehicle may include distance information, speed information, angle information, and signal intensity information.

During generation of at least one ODM object, the ODM output unit 40 may configure an ODM object with detection points having attributes in the same condition every cycle.

Here, the attributes in the same condition may include a longitudinal position, a lateral position, an angle, a distance, an absolute speed, and a relative speed.

During generation of at least one ODM object, the ODM output unit 40 may manage detection points, which are identified to be an ODM object every cycle, in a history region and may change a maximum sustain time of a detection point according to a history sustain condition.

Here, during generation of at least one ODM object, the ODM output unit 40 may determine an output value including a longitudinal/lateral distance and longitudinal speed of the ODM object based on hysteresis for each region of the grid map.

During output of the ODM information, the ODM output unit 40 may output ODM sensor fusion information to which a weight is applied depending on the accuracy of a sensor based on a detection region of the sensor.

For example, the ODM output unit 40 may output ODM sensor fusion information based on a sensor fusion longitudinal position that is acquired by fusing a longitudinal position of the front RADAR, to which a weight is applied, and a longitudinal position of the left/right lateral RADAR, and a sensor fusion lateral position that is acquired by fusing a lateral position of the front RADAR, to which a weight is applied, and a lateral position of the left/right lateral RADAR, in a region in which a detection region of the front RADAR and a detection region of the left/right lateral RADAR overlap each other and which has high accuracy.

As another example, the ODM output unit 40 may output ODM sensor fusion information based on a sensor fusion lateral position that is acquired by fusing a longitudinal position of the front RADAR, to which a weight is applied, and a longitudinal position of the left/right lateral RADAR, and a sensor fusion lateral position that is acquired by fusing a lateral position of the front RADAR and a lateral position of the left/right lateral RADAR, to which the weight is applied, in a region in which a detection region of the front RADAR and a detection region of the left/right lateral RADAR overlap each other and which has low accuracy.

As another example, the ODM output unit 40 may output ODM sensor fusion information based on a sensor fusion longitudinal position that is acquired by fusing a longitudinal position of the front RADAR, to which a weight is applied, and a longitudinal position of a left lateral RADAR, and a sensor fusion lateral position that is acquired by fusing a lateral position of the front RADAR and a lateral position of the left lateral RADAR, to which a weight is applied, in a region in which a detection region of the front RADAR and a detection region of the left lateral RADAR overlap each other and which has low accuracy.

As another example, the ODM output unit 40 may output ODM sensor fusion information based on a sensor fusion longitudinal position that is acquired by fusing a longitudinal position of the front RADAR, to which a weight is applied, and a longitudinal position of the right lateral RADAR, and a sensor fusion lateral position that is acquired by fusing a lateral position of the front RADAR and a lateral position of the right lateral RADAR, to which a weight is applied, in a region in which a detection region of the front RADAR and a detection region of the lateral RADAR overlap each other and which has low accuracy.

As another example, the ODM output unit 40 may output ODM sensor fusion information that is acquired by fusing a longitudinal position of the left lateral RADAR, to which a weight is applied, and a lateral position of the left lateral RADAR, to which a weight is applied, in a detection region of the left lateral RADAR.

As another example, the ODM output unit 40 may output ODM sensor fusion information that is acquired by fusing a longitudinal position of the right lateral RADAR, to which a weight is applied, and a lateral position of the right lateral RADAR, to which a weight is applied, in a detection region of the right lateral RADAR.

During output of the ODM information, the ODM output unit 40 may output ODM sensor fusion information to which a weight is applied depending on the accuracy of a sensor based on a detection region of the grid map.

For example, the ODM output unit 40 may output ODM sensor fusion information based on a sensor fusion longitudinal position that is acquired by fusing a longitudinal position of the front RADAR, to which a weight is applied, and a longitudinal position of the left lateral RADAR, and a sensor fusion lateral position that is acquired by fusing a lateral position of the front RADAR and a lateral position of the left lateral RADAR, to which a weight is applied, in an internal region of the grid map.

As another example, the ODM output unit 40 may output ODM sensor fusion information by fusing a longitudinal position of the right lateral RADAR, to which a weight is applied, and a lateral position of the right lateral RADAR, to which a weight is applied, in the first and second external regions of the grid map.

As another example, the ODM output unit 40 may output ODM sensor fusion information based on a sensor fusion longitudinal position that is acquired by fusing a longitudinal position of the front RADAR, to which a weight is applied, a longitudinal position of the left lateral RADAR, and a longitudinal position of the right lateral RADAR, and a sensor fusion lateral position that is acquired by fusing a lateral position of the front RADAR and a lateral position of the left lateral RADAR, to which a weight is applied, and a lateral position of the right lateral RADAR, in the internal region and the first and second external regions of the grid map.

Then, the cut-in vehicle identification unit 50 may identify a cut-in vehicle based on the output sensor fusion track and ODM information.

Here, the cut-in vehicle identification unit 50 may estimate heading information of the cut-in vehicle based on the output ODM information.

The cut-in vehicle identification unit 50 may apply gating of a predetermined region based on the sensor fusion track, may check a correlation between a sensor fusion track and the ODM information, and may identify the cut-in vehicle based on the sensor fusion track and the ODM information upon checking the correlation.

As such, according to the present disclosure, upon receiving a signal that is reflected after an electromagnetic wave is transmitted in a forward direction by a RADAR, signal transform (i.e., fast Fourier transform (FFT)) may be performed on the RADAR signal, and then, object detection and distance/speed/angle computation may be performed.

According to the present disclosure, track data may be output using a Kalman filter that is an algorithm in a sensor and ODM information may be output based on a detection level that is not a track level.

Here, with regard to output of the ODM information, at a subject vehicle speed equal to or less than about 30 kph, a front longitudinal (about 20 m) and lateral (about ±2.2 m) region may be divided into six (6) parts, and five pieces of information including a longitudinal position, a lateral position, a longitudinal speed, a flag indicating presence or absence, and possibility information may be output.

As such, according to the present disclosure, a short cut-in vehicle during low-velocity driving may be accurately identified based on sensor fusion track information and ODM information including a grid map, thereby preventing crash and enhancing safety.

According to the present disclosure, in an expressway congestion situation, RADAR detection information may be output in the form of a grid map to react to a short cut-in vehicle during low-velocity driving.

According to the present disclosure, with regard to output of occupancy distance map (ODM) information, at a subject vehicle speed equal to or less than about 30 kph, a front longitudinal (about 20 m) and lateral (about ±2.2 m) region may be divided into 6 parts, and five pieces of information including a longitudinal position, a lateral position, a longitudinal speed, a flag indicating presence or absence, and possibility information may be output based on a detection level that is not a track level.

According to the present disclosure, a weight may be applied depending on accuracy for each detection region of the front RADAR and the lateral RADAR based on the ODM information, and thus, reliable sensor fusion information may be output.

According to the present disclosure, heading information of a cut-in vehicle may be estimated using ODM output information corresponding to the internal and external region of the grid map, and as such, a degree by which the cut-in vehicle enters a subject lane may be determined.

According to the present disclosure, it may be possible to identify tight cut-in and loose cut-in using ODM output information corresponding to the internal region of the grid map.

According to the present disclosure, whether a vehicle is a cut-in vehicle may be determined based on the ODM information, and effectiveness of the sensor fusion track may also be determined to enhance reliability.

That is, according to the present disclosure, gating of a predetermined region may be applied based on the sensor fusion track to check a correlation with the ODM information, and thus, effectiveness of the sensor fusion track may be determined to enhance reliability.

According to the present disclosure, even if the longitudinal/lateral position of the sensor fusion track and the heading information are inaccurate, crash may be prevented and safety may be enhanced to react to a short cut-in vehicle during low-velocity driving using the ODM information.

Figure 2:
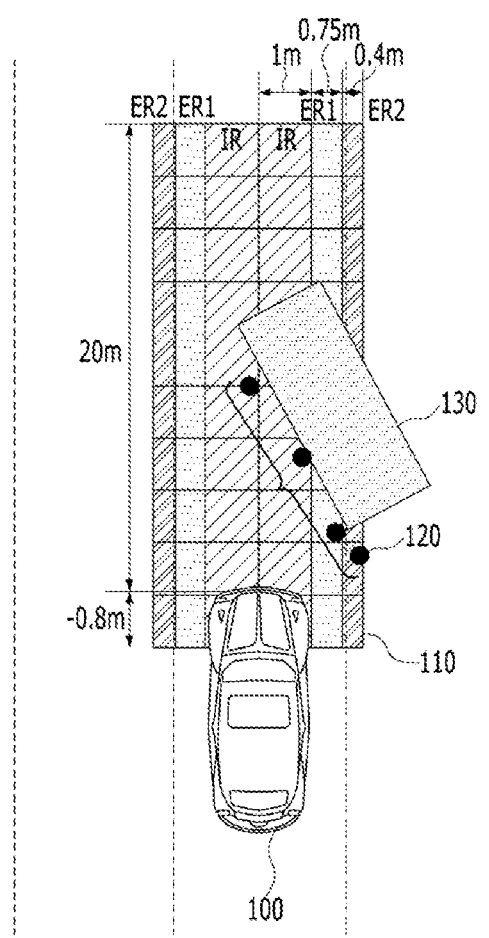
FIG. 2 is a diagram for explanation of a grid map of occupancy distance map (ODM) information.

FIG. 2 is a diagram for explanation of a grid map of ODM information.

As shown in FIG. 2, according to the present disclosure, occupancy distance map (ODM) information including a grid map 110 corresponding to a vehicle detection region and an ODM object 120 including a plurality of detection points may be output.

Accordingly, according to the present disclosure, even if a longitudinal/lateral position and heading information of a sensor fusion track 130 are inaccurate, crash may be prevented and safety may be enhanced to react to a short cut-in vehicle during low-velocity driving using the ODM information.

According to the present disclosure, the grid map 110 may be output at a speed of a subject vehicle 100, which is equal to or less than about 20 kph to about 30 kph.

Here, the grid map may have a length of about 15 m to about 25 m in a front longitudinal direction of the subject vehicle 100, and may have a width of about 4 m to about 5 m in a front lateral direction of the subject vehicle 100.

According to the present disclosure, the grid map 110 corresponding to the vehicle detection region may be generated based on lane information.

Here, the lane information may be extracted from information received from a navigation device or a front camera.

For example, the grid map 110 may include two internal regions IRs, two first external regions ER1, and two second external regions ER2.

A width of one internal region IR may be calculated according to IR=vehicle width/2+α (IR (Internal Region) being a width of an internal region, and α being a margin value in consideration of a side mirror).

Here, the vehicle width may be changed according to the specifications of the subject vehicle 100 and a may be about 0.5 m to about 1.5 m, but the present disclosure is not limited thereto.

A width of one first external region ER1 may be calculated according to ER1=vehicle width/2−IR (ER1 (External Region1) being a width of the first external region, and IR being a width of an internal region).

Here, the vehicle width may be about 3 m to about 4 m, but the present disclosure is not limited thereto.

A width of one second external region may be about 0.2 m to about 0.8 m.

The length of the internal region IR may be the same as the length of each of the first and second external regions ER1 and ER2.

For example, the length of each of the internal region IR, and the first and second external regions ER1 and ER2 may be about 15 m to about 25 m in a forward direction from a front surface of the subject vehicle 100.

As necessary, the length of the internal region IR may be smaller than the length of each of the first and second external regions ER1 and ER2.

For example, the length of the internal region IR may be about 15 m to about 25 m in the forward direction from the front surface of the subject vehicle 100.

The length of the first and second external regions ER1 and ER2 may be the sum of a first length of about 15 m to about 25 m in the forward direction from the front surface of the subject vehicle 100 and a second length of about 0.5 m to about 1.0 m in a backward direction from the front surface of the subject vehicle 100.

Also, specifications for each region in the grid map can be varied according to a vehicle type and a sensor specification.

Then, an area of the grid 110 map may be changed depending on a speed of the subject vehicle 100.

For example, an area of the grid map 110 may be widened as a speed of the subject vehicle 100 increases.

Figure 3:
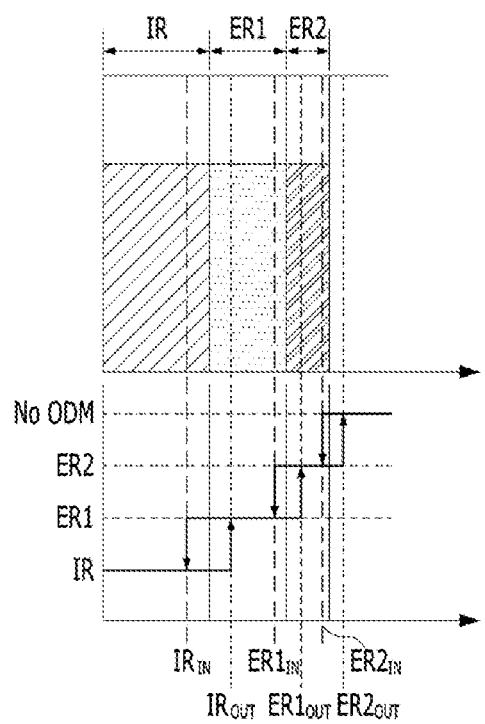
FIG. 3 is a diagram for explanation of a method of determining occupancy of an ODM region based on an effective measurement value.

FIG. 3 is a diagram for explanation of a method of determining occupancy of an ODM region based on an effective measurement value.

As shown in FIG. 3, according to the present disclosure, ODM region occupancy determination based on an effective measurement value may be performed according to the following determination conditions for each region.

First, IR region occupancy determination $IR_{IN}$ may determine occupancy when the effective measurement value is present in an internal region inside an IR reference line TBD meters (about 0.2 m).

Second, ER1 region occupancy determination $ER1_{IN}$ may determine occupancy when the effective measurement value is present in an internal region inside an ER1 reference line TBD m (about 0.15 m).

Third, ER2 region occupancy determination $ER2_{IN}$ may determine occupancy when the effective measurement value is present in an internal region inside an ER2 reference line TBD m (about 0.1 m).

In addition, according to the present disclosure, ODM region occupancy release determination based on an effective measurement value may be performed according to the following determination release conditions for each region.

First, IR region occupancy release determination $IR_{OUT}$ may determine occupancy release when the effective measurement value is not present in an internal region outside an IR reference line TBD m (about 0.2 m).

Second, ER1 region occupancy release determination $ER1_{OUT}$ may determine occupancy release when the effective measurement value is not present an internal region outside an ER1 reference line TBD m (about 0.15 m).

Third, ER2 region occupancy release determination $ER2_{OUT}$ may determine occupancy release when the effective measurement value is not present in an internal region outside an ER2 reference line TBD m (about 0.1 m).

Figure 4:
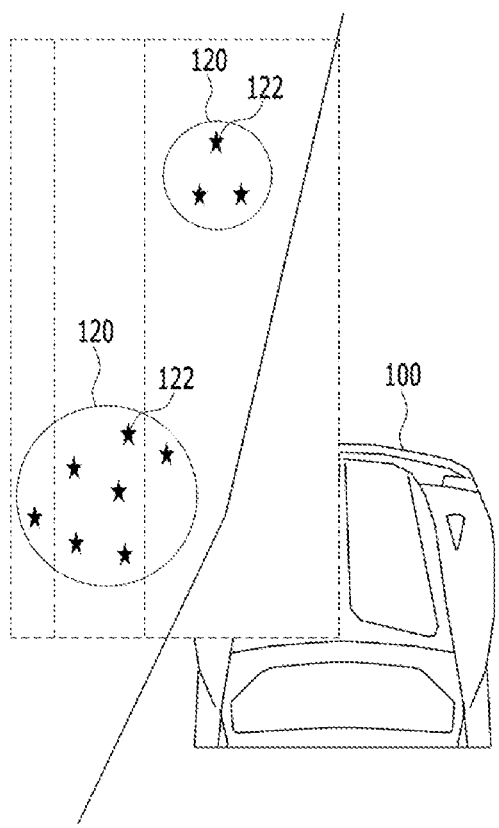
FIG. 4 is a diagram for explanation of an ODM object detection method.

FIG. 4 is a diagram for explanation of an ODM object detection method.

As shown in FIG. 4, according to the present disclosure, occupancy distance map (ODM) information including a plurality of detection points 122 and an ODM object 120.

Here, the detection points 122 may use only effective detection information among pieces of detection information transmitted from the RADAR.

For example, detection information used to determine ODM may include distance/speed/angle/signal intensity information.

In addition, the ODM object 120 may be a detection group that is identified to be an object or a vehicle, as a cluster.

The ODM object 120 may track a moved or stationary object using detection information output to an inner part of the ODM region.

That is, according to the present disclosure, the plurality of detection points 122 may be generated based on the effective detection information received from the front RADAR and the lateral RADAR of the subject vehicle 100, and the detection point group identified to be an object or a vehicle may be clustered among the plurality of detection points 122 positioned in the grid map to generate at least one ODM object 120.

Here, the effective detection information received from the front RADAR and the lateral RADAR of the subject vehicle 100 may include distance information, speed information, angle information, and signal intensity information.

According to the present disclosure, the ODM object 120 may be configured with the detection points 122 having attributes in the same condition every cycle.

Here, the attributes in the same condition may include a longitudinal position, a lateral position, an angle, a distance, an absolute speed, and a relative speed.

According to the present disclosure, the detection points 122 identified to be the ODM object 120 every cycle may be managed in a history region, and a maximum sustain time of the detection points 122 may be changed according to a history sustain condition.

Here, according to the present disclosure, an output value including a longitudinal/lateral distance and longitudinal speed of the ODM object 120 may be determined based on hysteresis for each region of the grid map.

Figure 5:
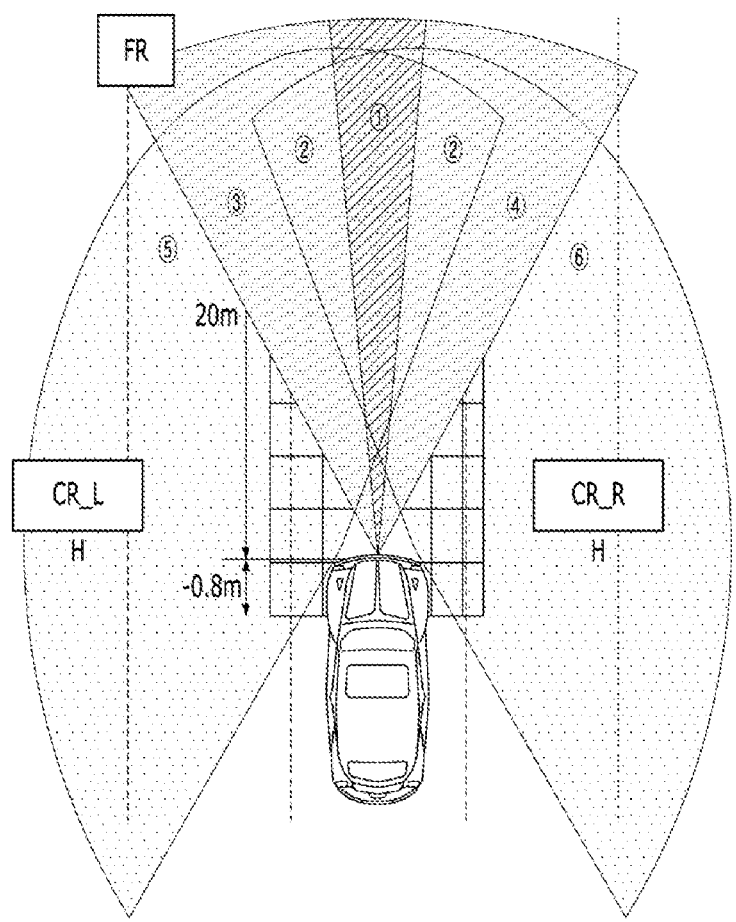
FIG. 5 is a diagram for explanation of ODM sensor fusion output depending on a detection region of a sensor.

FIG. 5 is a diagram for explanation of ODM sensor fusion output depending on a detection region of a sensor.

As shown in FIG. 5, according to the present disclosure, ODM sensor fusion information to which a weight is applied depending on the accuracy of a sensor based on the detection region of the sensor.

For example, according to the present disclosure, ODM sensor fusion information may be output based on a sensor fusion longitudinal position that is acquired by fusing a longitudinal position of the front RADAR, to which a weight is applied, and a longitudinal position of the left/right lateral RADAR, and a sensor fusion lateral position that is acquired by fusing a lateral position of the front RADAR, to which a weight is applied, and a lateral position of the left/right lateral RADAR, in region #1 that is a region in which a detection region of the front RADAR and a detection region of the left/right lateral RADAR overlap each other and which has high accuracy.

As another example, according to the present disclosure, ODM sensor fusion information may be output based on a sensor fusion longitudinal position that is acquired by fusing a longitudinal position of the front RADAR, to which a weight is applied, and a longitudinal position of the left/right lateral RADAR, and a sensor fusion lateral position that is acquired by fusing a lateral position of the front RADAR and a lateral position of the left/right lateral RADAR, to which a weight is applied, in region #2 that is a region in which a detection region of the front RADAR and a detection region of the left/right lateral RADAR overlap each other and which has low accuracy.

As another example, according to the present disclosure, ODM sensor fusion information may be output based on a sensor fusion longitudinal position that is acquired by fusing a longitudinal position of the front RADAR, to which a weight is applied, and a longitudinal position of the left lateral RADAR, and a sensor fusion lateral position that is acquired by fusing a lateral position of the front RADAR and a lateral position of the left lateral RADAR, to which a weight is applied, in region #3 that is a region in which a detection region of the front RADAR and a detection region of the left lateral RADAR overlap each other and which has low accuracy.

As another example, according to the present disclosure, ODM sensor fusion information may be output based on a sensor fusion longitudinal position that is acquired by fusing a longitudinal position of the front RADAR, to which a weight is applied, and a longitudinal position of the right lateral RADAR, and a sensor fusion lateral position that is acquired by fusing a lateral position of the front RADAR and a lateral position of the right lateral RADAR, to which a weight is applied, in region #4, which is a region in which a detection region of the front RADAR and a detection region of the right lateral RADAR overlap each other and has low accuracy.

As another example, according to the present disclosure, ODM sensor fusion information acquired by fusing a longitudinal position of the left lateral RADAR, to which a weight is applied, and a lateral position of the left lateral RADAR, to which a weight is applied, may be output in region #5 that is a detection region of the left lateral RADAR.

As another example, according to the present disclosure, ODM sensor fusion information acquired by fusing a longitudinal position of the right lateral RADAR, to which a weight is applied, and a lateral position of the right lateral RADAR, to which a weight is applied, may be output in region #6, which is a detection region of the right lateral RADAR.

Figure 6:
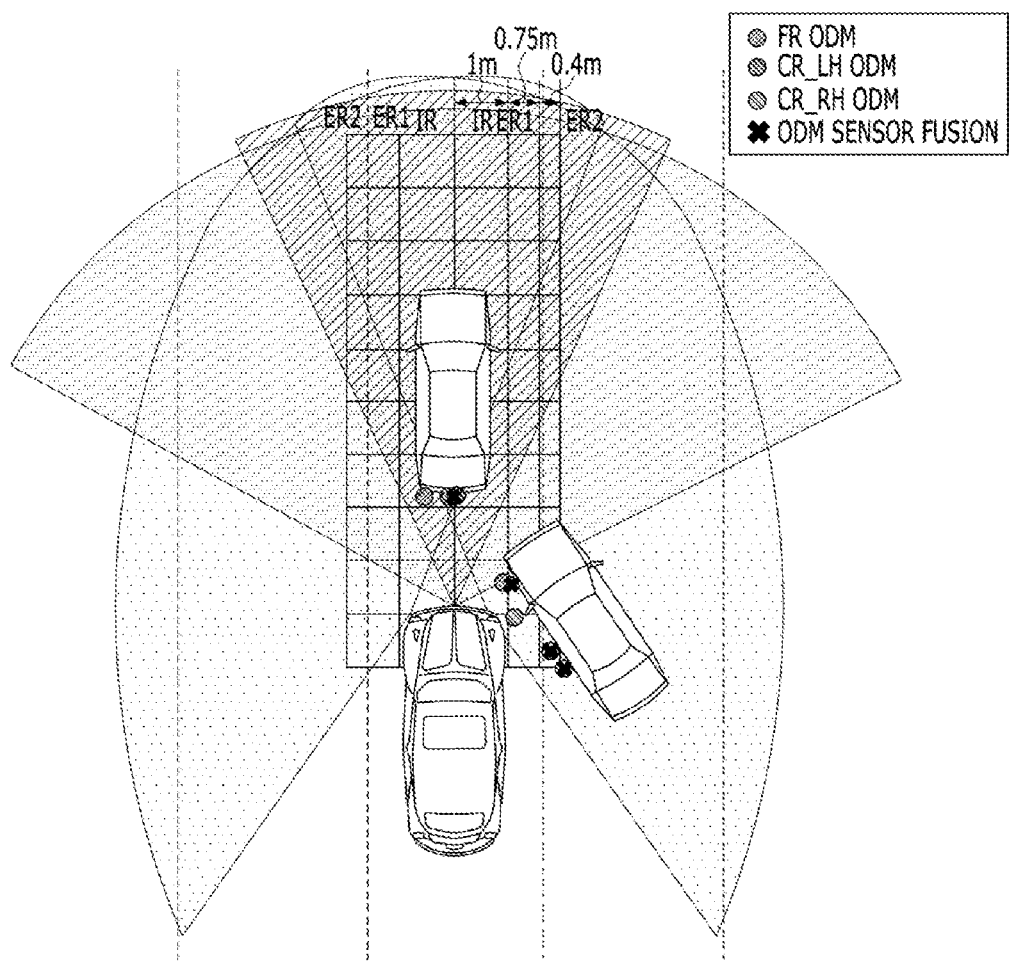
FIGS. 6, 7, and 8 are diagrams for explanation of ODM sensor fusion output depending on a detection region of a grid map.
Figure 7:
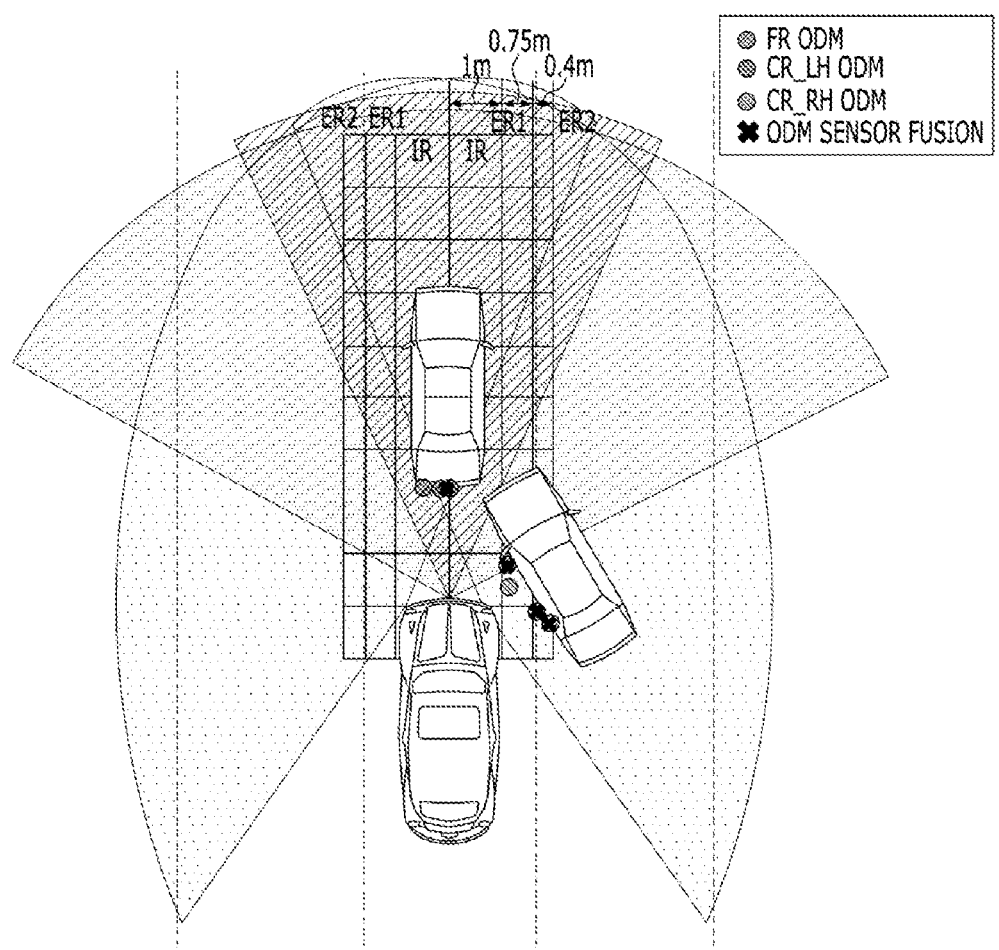
Figure 8:
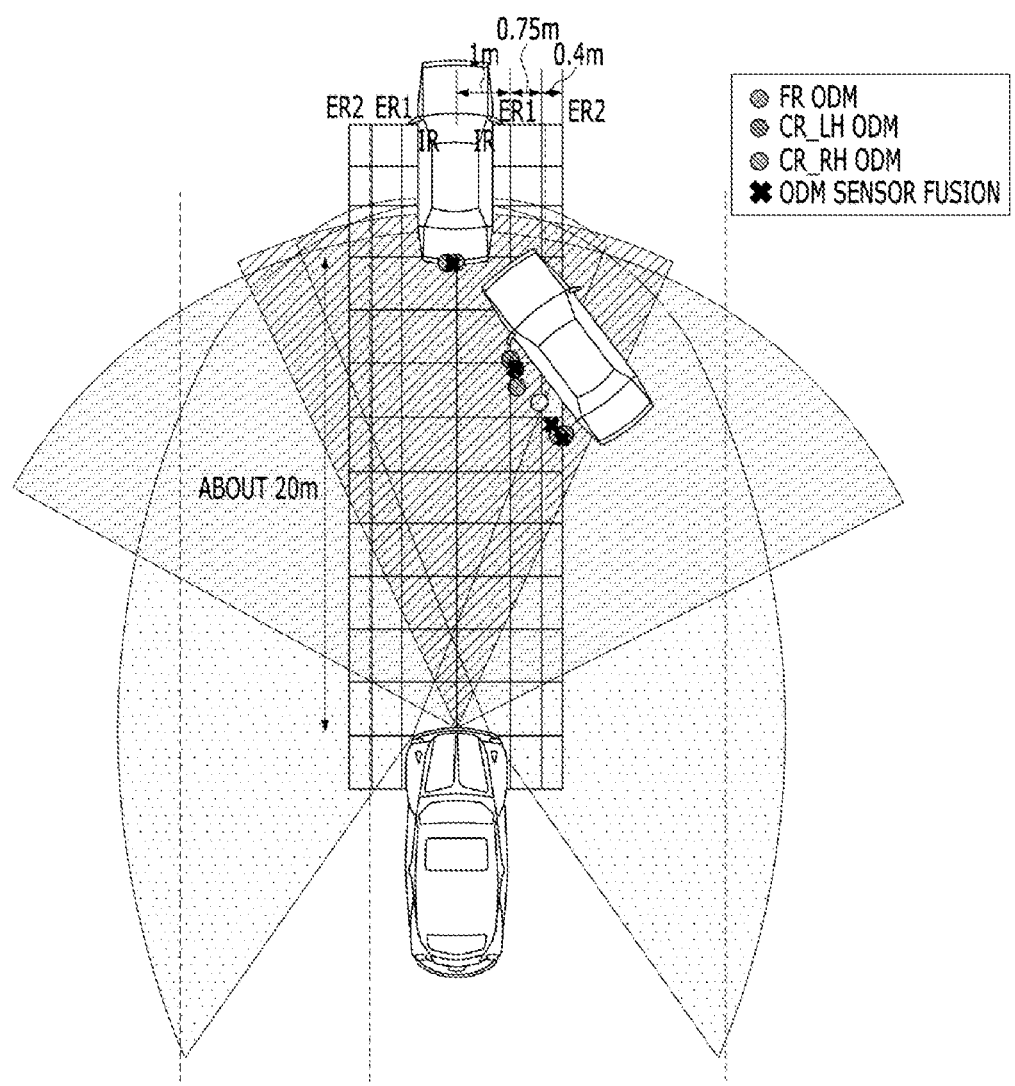

FIGS. 6 to 8 are diagrams for explanation of ODM sensor fusion output depending on a detection region of a grid map.

As shown in FIGS. 6 to 8, according to the present disclosure, ODM sensor fusion information to which a weight is applied depending on the accuracy of a sensor based on the detection of the grid map may be output.

For example, as shown in FIG. 6, according to the present disclosure, in the case of a tight cut-in situation, ODM sensor fusion information may be output based on a sensor fusion longitudinal position that is acquired by fusing a longitudinal position of the front RADAR, to which a weight is applied, and a longitudinal position of the left lateral RADAR, and a sensor fusion lateral position that is acquired by fusing a lateral position of the front RADAR and a lateral position of the left lateral RADAR, to which a weight is applied, in the internal region IR of the grid map.

That is, the front RADAR FR has higher reliability in a longitudinal direction based on a subject vehicle, and the lateral RADAR CR has higher reliability in a lateral direction, and thus, a weight may be applied to ODM of the front RADAR FR at a longitudinal position, and a weight may be applied to ODM of the lateral RADAR CR at a lateral position.

In addition, according to the present disclosure, ODM sensor fusion information acquired by fusing a longitudinal position of the right lateral RADAR, to which a weight is applied, and a lateral position of the right lateral RADAR, to which a weight is applied, may be output in the first and second external regions ER1 and ER2 of the grid map.

That is, ODM information of the lateral RADAR CR may be used as final ODM output with respect to short-distance regions ER1 and ER2 that are out of a field of view (FOV) of the front RADAR FR.

In addition, according to the present disclosure, heading information of a cut-in vehicle may be estimated using ODM output information of IR, ER1, and ER2, and tight cut-in may be identified using IR output information.

As another example, as shown in FIG. 7, according to the present disclosure, in the case of a loose cut-in situation, ODM sensor fusion information may be output based on a sensor fusion longitudinal position that is acquired by fusing a longitudinal position of the front RADAR, to which a weight is applied, and a longitudinal position of the left lateral RADAR, and a sensor fusion lateral position that is acquired by fusing a lateral position of the front RADAR and a lateral position of the left lateral RADAR, to which a weight is applied, in the internal region IR of the grid map.

That is, the front RADAR FR has higher reliability in a longitudinal direction based on a subject vehicle, and the lateral RADAR CR has higher reliability in a lateral direction, and thus, a weight may be applied to ODM of the front RADAR FR at a longitudinal position, and a weight may be applied to ODM of the lateral RADAR CR at a lateral position.

In addition, according to the present disclosure, ODM sensor fusion information acquired by fusing a longitudinal position of the right lateral RADAR, to which a weight is applied, and a lateral position of the right lateral RADAR, to which a weight is applied, may be output in the first and second external regions ER1 and ER2 of the grid map.

That is, ODM information of the lateral RADAR CR may be used as final ODM output with respect to short-distance regions ER1 and ER2 that are out of a field of view (FOV) of the front RADAR FR.

In addition, according to the present disclosure, heading information of a cut-in vehicle may be estimated using ODM output information of IR, ER1, and ER2, and loose cut-in may be identified using IR output information.

As another example, as shown in FIG. 8, according to the present disclosure, in the case of a general cut-in situation, ODM sensor fusion information may be output based on a sensor fusion longitudinal position that is acquired by fusing a longitudinal position of the front RADAR, to which a weight is applied, a longitudinal position of the left lateral RADAR, and a longitudinal position of the right lateral RADAR, and a sensor fusion lateral position that is acquired by fusing a lateral position of the front RADAR and a lateral position of the left lateral RADAR, to which a weight is applied, and a lateral position of the right lateral RADAR, in the first and first and second external regions IR, ER1, and ER2 of the grid map.

That is, in a region with high accuracy of the front RADAR FR, reliability of the front RADAR FR is higher than the lateral RADAR CR with respect to a lateral position, and thus, a weight may be applied to the front RADAR FR in both the longitudinal position and the lateral position, which is used in fusion of the ODM sensor.

Accordingly, according to the present disclosure, heading information of the cut-in vehicle may be estimated using ODM output information of IR, ER1, and ER2, and cut-in may be identified using IR output information.

Figure 9:
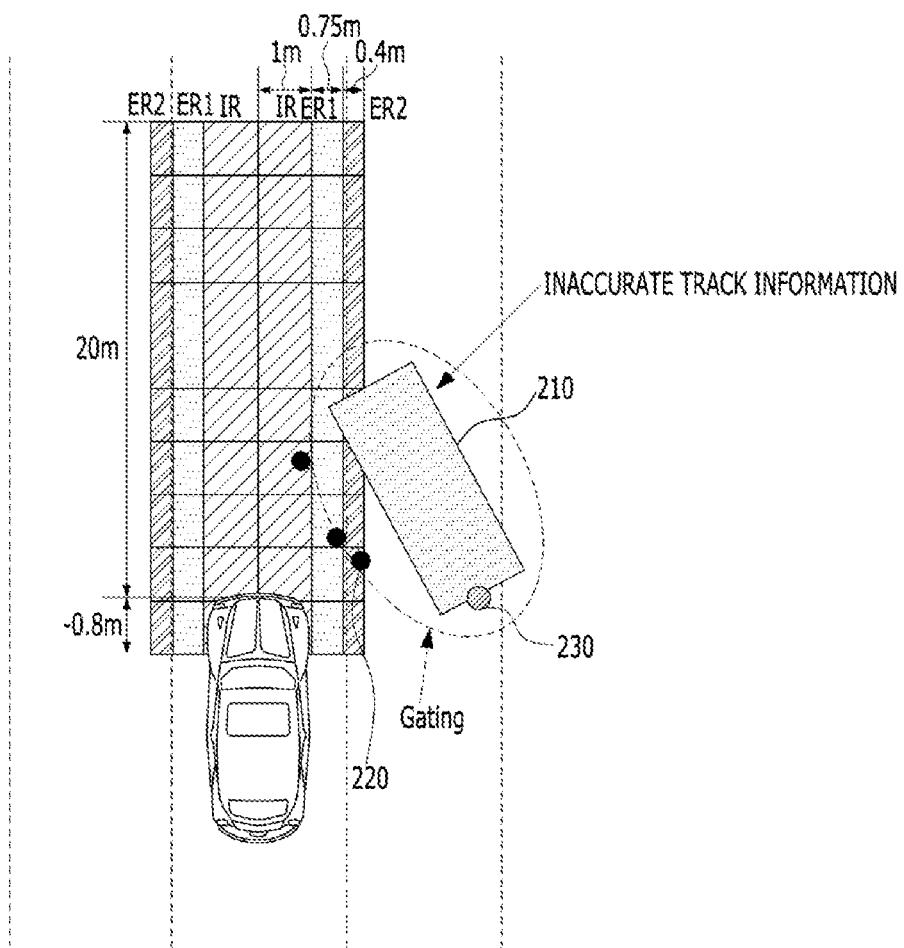
FIG. 9 is a diagram for explanation of a method of determining effectiveness of an ODM-based sensor fusion track.

FIG. 9 is a diagram for explanation of a method of determining effectiveness of an ODM-based sensor fusion track.

As shown in FIG. 9, according to the present disclosure, ODM information-based sensor fusion track reliability may be enhanced to identify cut-in.

That is, according to the present disclosure, gating of a predetermined region may be applied based on sensor fusion track information 210, a correlation between a sensor fusion track 230 and ODM information 220 may be checked, and upon checking the correlation, the cut-in vehicle may be identified based on the sensor fusion track 230 and the ODM information 220.

For example, according to the present disclosure, effectiveness of the sensor fusion track may be determined based on ODM information, and gating of a predetermined region may be applied based on a track to check a correlation with ODM information.

Accordingly, according to the present disclosure, sensor fusion track information of the cut-in vehicle, which includes longitudinal position/lateral position/width/length/heading information, may be output.

According to the present disclosure, even if longitudinal/lateral position/heading information of the sensor fusion track is inaccurate, the reliability of cut-in identification may be enhanced using ODM information.

According to the present disclosure, during identification of the cut-in vehicle, when identification information indicating that the cut-in vehicle enters the second external region of the grid map is received, driving of the subject vehicle may be maintained, and when identification information indicating that the cut-in vehicle enters the first external region of the grid map is received, acceleration prevention of the subject vehicle may be controlled.

According to the present disclosure, during identification of the cut-in vehicle, brake and start prevention of the subject vehicle may be controlled when identification information indicating that both the sensor fusion track and the ODM information are present in the internal region of the grid map is received, warning may be controlled to be output when identification information indicating that only the sensor fusion track or the ODM information is present in the internal region of the grid map, and start of the subject vehicle may be controlled when identification information indicating that both the sensor fusion track and the ODM information are not present in the internal region of the grid map.

Figure 10:
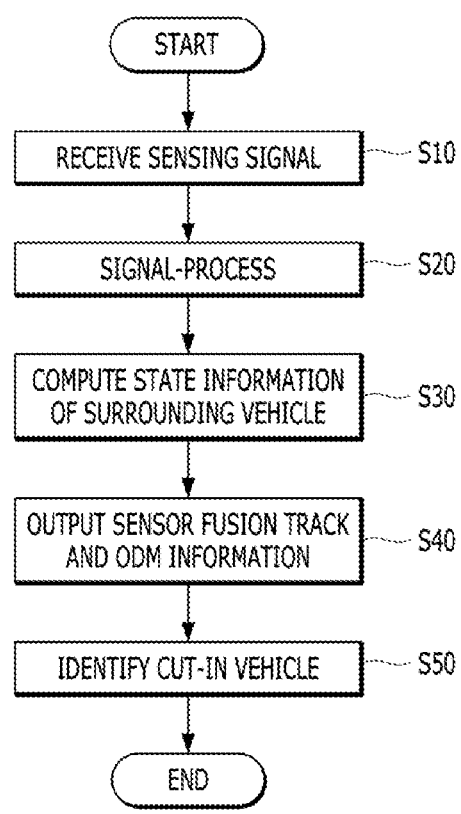
FIG. 10 is a flowchart for explanation of a method of identifying a short cut-in vehicle according to the present disclosure.

FIG. 10 is a flowchart for explanation of a method of identifying a short cut-in vehicle according to the present disclosure.

As shown in FIG. 10, according to the present disclosure, a plurality of sensing signals may be received (S10).

Here, in the receiving of the plurality of sensing signals, the sensing signals may be received from the front RADAR and lateral RADAR of the subject vehicle.

According to the present disclosure, the received sensing signals may be signal-processed (S20).

Then, according to the present disclosure, state information of a surrounding vehicle, which is detected from the signal-processed signal, may be computed (S30).

Here, in the computing of the state information of the detected surrounding vehicle, distance information, speed information, and angle information of the detected surrounding vehicle may be computed.

In this case, the distance information of the detected surrounding vehicle may be computed based on a delay time of a frequency modulated continuous wave (FMCW), the speed information of the detected surrounding vehicle may be calculated based on the Doppler frequency, and the angle information of the detected surrounding vehicle may be calculated based on digital beamforming.

Then, according to the present disclosure, sensor fusion track information and occupancy distance map (ODM) information including a grid map corresponding to a vehicle detection region and an ODM object including a plurality of detection points may be output based on the computed state information of the surrounding vehicle (S40).

Here, during output of the ODM information, a grid map, a longitudinal position, a lateral position, a longitudinal speed, a flag indicating presence or absence, and possibility information, which are obtained by dividing a front longitudinal and lateral region into six (6) parts, may be output at a subject vehicle equal to or less than a predetermined speed.

During output of the ODM information, a grid map corresponding to the vehicle detection region may be generated based on the lane information.

For example, the grid map may include two internal regions, two first external regions, and two second external regions.

As necessary, an area of the grid map may be changed depending on a speed of the subject vehicle.

During output of the ODM information, a plurality of detection points may be generated based on the effective detection information received from the front RADAR and the lateral RADAR of the subject vehicle, and a detection point group identified to be an object or a vehicle among a plurality of detection points positioned in the grid map may be clustered to generate at least one ODM object.

Here, during generation of at least one ODM object, an ODM object may be configured with detection points having attributes in the same condition every cycle.

During generation of at least one ODM object, detection points, which are identified to be an ODM object every cycle, may be managed in a history region and a maximum sustain time of a detection point may be changed according to a history sustain condition.

During generation of at least one ODM object, an output value including a longitudinal/lateral distance and longitudinal speed of the ODM object may be determined based on hysteresis for each region of the grid map.

During output of the ODM information, ODM sensor fusion information to which a weight is applied may be output depending on the accuracy of a sensor based on a detection region of the sensor.

During output of the ODM information, ODM sensor fusion information, to which a weight is applied depending on the accuracy of a sensor based on a detection region of the grid map, may also be output.

According to the present disclosure, the cut-in vehicle may be identified based on the output sensor fusion track and ODM information (S50).

Here, during identification of the cut-in vehicle, the heading information of the cut-in vehicle may be estimated based on the output ODM information.

During identification of the cut-in vehicle, gating of a predetermined region may be applied based on the sensor fusion track, a correlation between the sensor fusion track and the ODM information may be checked, and the cut-in vehicle may be identified based on the sensor fusion track and the ODM information upon checking the correlation.

Also, specifications for each region of the ODM can be varied according to a vehicle type and a sensor specification.

According to the present disclosure, a computer readable recording medium having recorded thereon a program for executing a method of identifying a short cut-in of a short cut-in vehicle identification apparatus may execute procedures provided in the method of identifying short-cut in according to an embodiment of the present disclosure.

A vehicle according to an embodiment of the present disclosure may include a sensing apparatus for sensing a surrounding vehicle, a short cut-in vehicle identification apparatus for identifying a cut-in vehicle based on surrounding vehicle information received from the sensing apparatus, and a control apparatus for controlling driving of a subject vehicle based on identification information received from the short cut-in vehicle identification apparatus, and in this case, the short cut-in vehicle identification apparatus may include a signal conversion unit for receiving a plurality of sensing signals and signal-processing the sensing signals, a computation unit for computing state information of the surrounding vehicle detected from the signal-processed signal, a sensor fusion track output unit for outputting a sensor fusion track based on the computed state information of the surrounding vehicle, an ODM output unit for outputting ODM information including a grid map corresponding to a vehicle detection region based on the computed state information of the surrounding vehicle and an ODM object including a plurality of detection points, and a cut-in vehicle identification unit for identifying a cut-in vehicle based on the output sensor fusion track and ODM information.

Here, the control apparatus may maintain driving of the subject vehicle upon receiving identification indicating that the cut-in vehicle enters the second external region of the grid map, may control acceleration prevention of the subject vehicle upon receiving identification information indicating that the cut-in vehicle enters the first external region of the grid map, may control brake and start prevention of the subject vehicle upon receiving identification information indicating that both the sensor fusion track and the ODM information are present in the internal region of the grid map, may control warning to be output upon receiving identification information indicating that only the sensor fusion track or the ODM information is present in the internal region of the grid map, and may control start of the subject vehicle upon receiving identification information indicating that both the sensor fusion track and the ODM information are not present in the internal region of the grid map.

As such, according to the present disclosure, a short cut-in vehicle during low-velocity driving may be accurately identified based on sensor fusion track information and ODM information including a grid map, thereby preventing crash and enhancing safety.

According to the present disclosure, in an expressway congestion situation, RADAR detection information may be output in the form of a grid map to react to a short cut-in vehicle during low-velocity driving.

According to the present disclosure, with regard to output of occupancy distance map (ODM) information, at a subject vehicle speed equal to or less than about 30 kph, a front longitudinal (about 20 m) and lateral (about ±2.2 m) region may be divided into 6 parts, and five pieces of information including a longitudinal position, a lateral position, a longitudinal speed, a flag indicating presence or absence, and possibility information may be output based on a detection level that is not a track level.

According to the present disclosure, a weight may be applied depending on accuracy for each detection region of the front RADAR and the lateral RADAR based on the ODM information, and thus, reliable sensor fusion information may be output.

According to the present disclosure, heading information of a cut-in vehicle may be estimated using ODM output information corresponding to the internal and external region of the grid map, and as such, a degree by which the cut-in vehicle enters a subject lane may be determined.

According to the present disclosure, it may be possible to identify tight cut-in and loose cut-in using ODM output information corresponding to the internal region of the grid map.

According to the present disclosure, whether a vehicle is a cut-in vehicle may be determined based on the ODM information, and effectiveness of the sensor fusion track may also be determined to enhance reliability.

That is, according to the present disclosure, gating of a predetermined region may be applied based on the sensor fusion track to check a correlation with the ODM information, and thus, effectiveness of the sensor fusion track may be determined to enhance reliability.

According to the present disclosure, even if the longitudinal/lateral position of the sensor fusion track and the heading information are inaccurate, crash may be prevented and safety may be enhanced to react to a short cut-in vehicle during low-velocity driving using the ODM information.

The above configured apparatus and method for identifying a short cut-in vehicle, and a vehicle using the same related to at least one embodiment of the present disclosure may accurately identify a short cut-in vehicle during low-velocity driving based on sensor fusion track information and ODM information including a grid map, thereby preventing crash and enhancing safety.

According to the present disclosure, in an expressway congestion situation, RADAR detection information may be output in the form of a grid map to react to a short cut-in vehicle during low-velocity driving.

According to the present disclosure, with regard to output of occupancy distance map (ODM) information, at a subject vehicle speed equal to or less than about 30 kph, a front longitudinal (about 20 m) and lateral (about ±2.2 m) region may be divided into 6 parts, and five pieces of information including a longitudinal position, a lateral position, a longitudinal speed, a flag indicating presence or absence, and possibility information may be output based on a detection level that is not a track level.

According to the present disclosure, a weight may be applied depending on accuracy for each detection region of the front RADAR and the lateral RADAR based on the ODM information, and thus, reliable sensor fusion information may be output.

According to the present disclosure, heading information of a cut-in vehicle may be estimated using ODM output information corresponding to the internal and external region of the grid map, and as such, a degree by which the cut-in vehicle enters a subject lane may be determined.

According to the present disclosure, it may be possible to identify tight cut-in and loose cut-in using ODM output information corresponding to the internal region of the grid map.

According to the present disclosure, whether a vehicle is a cut-in vehicle may be determined based on the ODM information, and effectiveness of the sensor fusion track may also be determined to enhance reliability.

That is, according to the present disclosure, gating of a predetermined region may be applied based on the sensor fusion track to check a correlation with the ODM information, and thus, effectiveness of the sensor fusion track may be determined to enhance reliability.

According to the present disclosure, even if the longitudinal/lateral position of the sensor fusion track and the heading information are inaccurate, crash may be prevented and safety may be enhanced to react to a short cut-in vehicle during low-velocity driving using the ODM information.

It will be appreciated by persons skilled in the art that that the effects that could be achieved with the present disclosure are not limited to what has been particularly described hereinabove and other advantages of the present disclosure will be more clearly understood from the detailed description.

The aforementioned present disclosure can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, carrier waves (e.g., transmission via the Internet), etc.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

The invention claimed is:

1. An apparatus for identifying a short cut-in vehicle, the apparatus comprising:
   a signal conversion unit configured to receive and signal-process a plurality of sensing signals;
   a computation unit configured to compute state information of a surrounding vehicle detected from the signal-processed signal;
   a sensor fusion track output unit configured to output a sensor fusion track based on the computed state information of the surrounding vehicle;
   an occupancy distance map (ODM) output unit configured to output ODM information including a grid map corresponding to a vehicle detection region and an ODM object including a plurality of detection points based on the computed state information of the surrounding vehicle; and
   a cut-in vehicle identification unit configured to identify a cut-in vehicle based on the output sensor fusion track and ODM information.

2. The apparatus of claim 1, wherein the signal conversion unit receives the plurality of sensing signals from a front radio detection and ranging (RADAR) and a lateral RADAR of the subject vehicle during reception of the plurality of sensing signals.

3. The apparatus of claim 1, wherein the computation unit computes distance information, speed information, and angle information of the detected surrounding vehicle during computation of the state information of the detected surrounding vehicle.

4. The apparatus of claim 1, wherein the ODM output unit outputs a grid map, a longitudinal position, a lateral position, a longitudinal speed, a flag indicating presence or absence, and possibility information, which are obtained by dividing a front longitudinal and lateral region into 6 parts, at a subject vehicle equal to or less than a predetermined speed during output of the ODM information.

5. The apparatus of claim 1, wherein the ODM output unit generates a grid map corresponding to the vehicle detection region based on lane information during output of the ODM information.

6. The apparatus of claim 1, wherein the ODM output unit generates a plurality of detection points based on effective detection information received from the front RADAR and lateral RADAR of the subject vehicle, and clusters a detection point group identified to be an object or a vehicle among the plurality of detection points positioned in the grid map to generate at least one ODM object during output of the ODM information.

7. The apparatus of claim 1, wherein the ODM output unit outputs ODM sensor fusion information to which a weight is applied depending on accuracy of a sensor based on a detection region of the sensor during output of the ODM information.

8. The apparatus of claim 1, wherein the ODM output unit outputs ODM sensor fusion information to which a weight is applied depending on accuracy of a sensor based on a detection region of the grid map during output of the ODM information.

9. The apparatus of claim 1, wherein the cut-in vehicle identification unit estimates heading information of a cut-in vehicle based on the output ODM information.

10. The apparatus of claim 1, wherein the cut-in vehicle identification unit applies gating of a predetermined region based on the sensor fusion track, checks a correlation between a sensor fusion track and the ODM information, and identifies the cut-in vehicle based on the sensor fusion track and the ODM information upon checking the correlation.

11. A method of identifying a short cut-in vehicle, the method comprising:
   receiving a plurality of sensing signals;
   signal-processing the received sensing signals;
   computing state information of a surrounding vehicle detected from the signal-processed signal;
   outputting a sensor fusion track based on the computed state information of the surrounding vehicle, and ODM information including a grid map corresponding to a vehicle detection region and an ODM object including a plurality of detection points, based on the computed state information of the surrounding vehicle; and identifying a cut-in vehicle based on the output sensor fusion track and ODM information.

12. The method of claim 11, wherein the receiving the plurality of sensing signals includes receiving the plurality of sensing signals from a front radio detection and ranging (RADAR) and a lateral RADAR of the subject vehicle.

13. The method of claim 11, wherein the computing the state information of the detected surrounding vehicle includes computing distance information, speed information, and angle information of the detected surrounding vehicle.

14. The method of claim 11, wherein the outputting the ODM information includes generating a grid map corresponding to the vehicle detection region based on lane information.

15. The method of claim 11, wherein the outputting the ODM information includes generating a plurality of detection points based on effective detection information received from the front RADAR and the lateral RADAR of the subject vehicle, and clustering a detection point group identified to be an object or a vehicle among the plurality of detection points positioned in the grid map to generate at least one ODM object.

16. The method of claim 11, wherein the outputting the ODM information includes outputting ODM sensor fusion information to which a weight is applied depending on accuracy of a sensor based on a detection region of the sensor.

17. The method of claim 11, wherein the outputting the ODM information includes outputting ODM sensor fusion information to which a weight is applied depending on accuracy of a sensor based on a detection region of the grid map.

18. The method of claim 11, wherein the identifying the cut-in vehicle includes estimating heading information of a cut-in vehicle based on the output ODM information.

19. The method of claim 11, wherein the identifying the cut-in vehicle includes applying gating of a predetermined region based on the sensor fusion track, checking a correlation between a sensor fusion track and the ODM information, and identifying the cut-in vehicle based on the sensor fusion track and the ODM information upon checking the correlation.

20. A vehicle comprising:

a sensing apparatus configured to sense a surrounding vehicle;

a short cut-in vehicle identification apparatus configured to determine a cut-in vehicle based on surrounding vehicle information received from the sensing apparatus; and a control apparatus configured to control driving of a subject vehicle based on identification information received from the short cut-in vehicle identification apparatus, wherein the short cut-in vehicle identification apparatus includes:

a signal conversion unit configured to receive and signal-process a plurality of sensing signals;

a computation unit configured to compute state information of a surrounding vehicle detected from the signal-processed signal;

a sensor fusion track output unit configured to output a sensor fusion track based on the computed state information of the surrounding vehicle;

an occupancy distance map (ODM) output unit configured to output ODM information including a grid map corresponding to a vehicle detection region and an ODM object including a plurality of detection points based on the computed state information of the surrounding vehicle; and a cut-in vehicle identification unit configured to identify a cut-in vehicle based on the output sensor fusion track and ODM information.

* * * * *